Oct. 3, 1967
F. AGUIRRE-BATRES ETAL  3,344,734
INDIVIDUAL COFFEE EXTRACTOR WITH
CONTROLLED EXTRACTING TIME
Filed Nov. 16, 1964
2 Sheets-Sheet 1
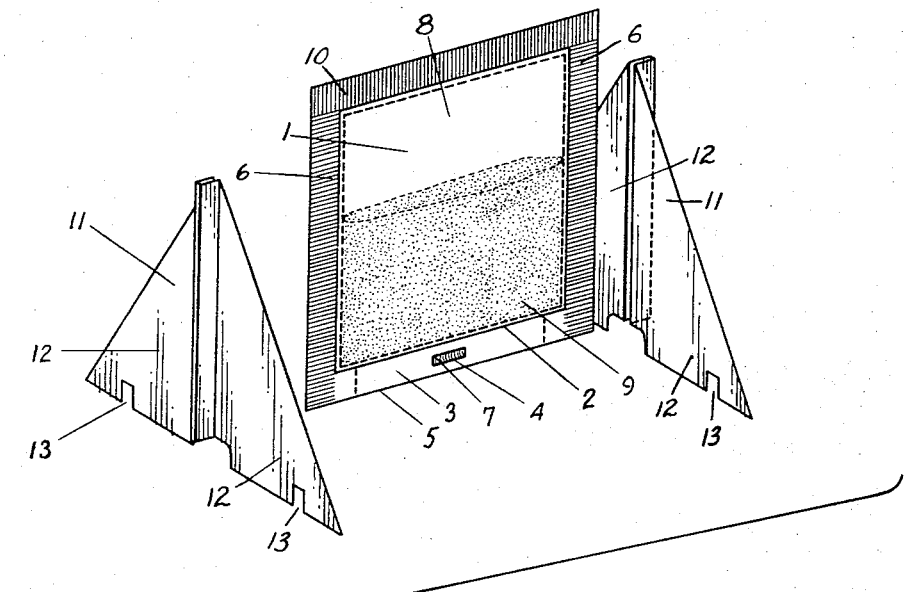
FIG.1
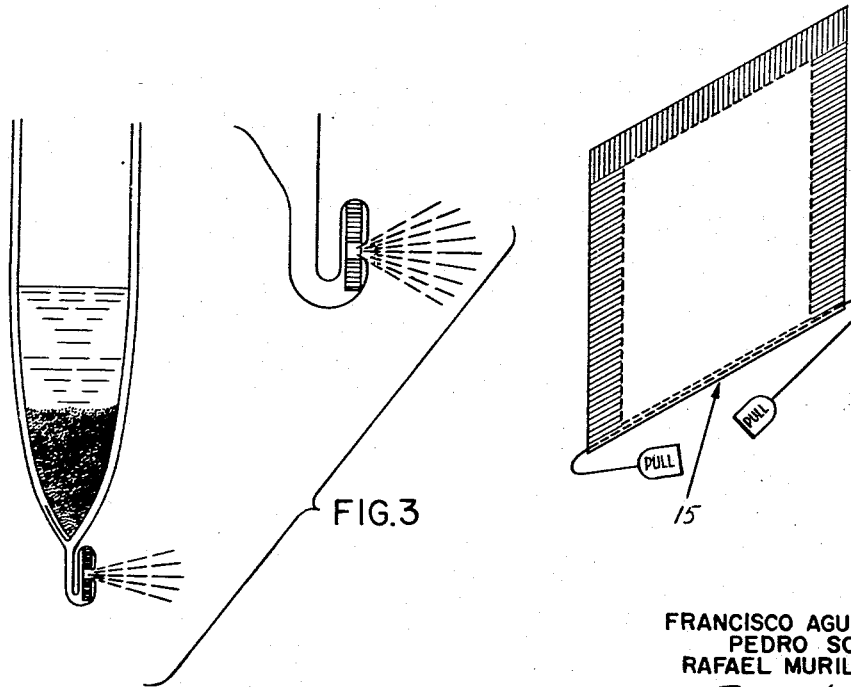
FIG.3
FIG.4
INVENTORS
FRANCISCO AGUIRRE-BATRES
PEDRO SOLE JR.
RAFAEL MURILLO-SOLIS
BY
ATTORNEYS Oct. 3, 1967   F. AGUIRRE-BATRES ET AL   3,344,734
INDIVIDUAL COFFEE EXTRACTOR WITH
CONTROLLED EXTRACTING TIME
Filed Nov. 16, 1964   2 Sheets-Sheet 2
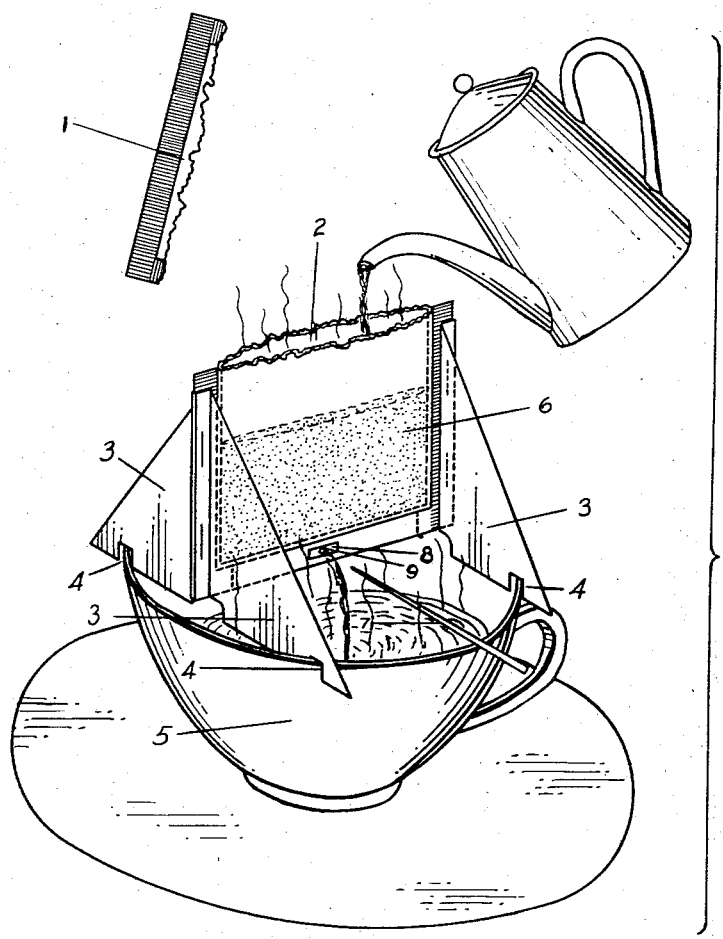
FIG. 2
FIG. 5
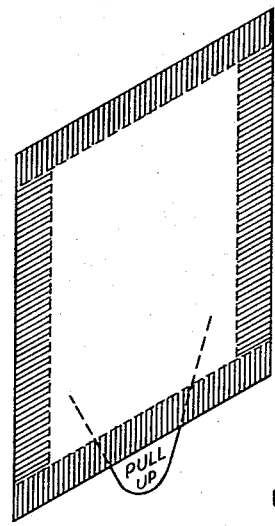
INVENTORS
FRANCISCO AGUIRRE-BATRES
PEDRO SOLE JR.
RAFAEL MURILLO-SOLIS
BY
ATTORNEYS

# United States Patent Office 3,344,734
Patented Oct. 3, 1967

3,344,734
INDIVIDUAL COFFEE EXTRACTOR WITH CONTROLLED EXTRACTING TIME
Francisco Aguirre-Batres, Pedro Sole, Jr., and Rafael Murillo-Solis, all of Guatemala, Guatemala, assignors to Instituto Centroamericano de Investigacion y Tecnologia Industrial, Guatemala, Guatemala, a corporation of Guatemala
Filed Nov. 16, 1964, Ser. No. 411,969
4 Claims. (Cl. 99—304)

This invention relates to a device for the making of hot infusions from extractable vegetable matter. It is particularly suited to the making of hot coffee from the original coffee grounds.

While many designs of package-extractor devices are known in the art, all of them have important limitations in the mechanics of making a good cup of coffee.

It has been found in practical testing that those filter devices which depend on a multiplicity of perforations as the only means to hold the coffee grounds and allow the hot infusion to pass, tend to clog up with the coffee grounds. This results from the fact that coffee grounds usually consist of a wide distribution of sizes rather than a more or less uniform size for all the particles making up the particular grind.

The above limitation has been overcome by the use of porous paper (filter paper) as a lining inside the extractor. This, however, has another limitation in the fact that given a particular coffee grind and a particular porosity in the filter paper, the residence time for the hot water is rigidly set, with no allowance for individual taste in the strength of the resulting cup. Even more, the resulting cups are usually weak due to insufficient contact between the coffee grounds and the hot water.

Other devices, supported from the rim of the cup inwards or leaning on the side of the cup and resting in the bottom, have to be submerged at least partially in the coffee infusion. This is not only unhygienic but somewhat untidy.

In still other systems an accessory supporting device, not included in the coffee package, is required thus defeating partially the idea of an extractor independent of additional gadgets.

Most of the known devices are furthermore too complicated to be handled by conventional pouch making and filling machines at a commercially competitive cost.

It is the purpose of this invention to provide a package extractor suitable for its making and filling by means of conventional packaging equipment.

Further, it is the object of this invention to incorporate into the design, the supporting means to hold the extractor above the cup where the infusion will be received.

It is finally an important object of this invention to provide means for the variation, at will, of the residence time of the hot water in contact with the extractable material.

Other objects and advantages of the invention will in part be obvious and in part appear hereinafter.

The invention, accordingly, is in a device or packet for making an individual cup of coffee, cup of tea, or other extract, this being the exemplary infusion contemplated, the packet being of a size smaller than the standard four ounce cup but large enough so that it can at one time hold a substantial fraction of a cup of water; the device consisting of a dual envelope, an outer liquid impermeable envelope, and an inner envelope consisting essentially of a permeable material such as filter paper, the outer envelope having a bottom edge which is made of several thicknesses to be relatively self-supporting, or so formed to include a rigid supporting guide member therein, the side edges of the pouch carrying means with which the entire device can be supported on the rim of a cup of coffee. The bottom edge in the preferred embodiment of the invention carries wooden or plastic guide member, folded therein, and provided with perforations so that, following a desired time interval, the user can puncture the outer envelope at the guide point without puncturing the inner envelope. That is, the bottom edge of the device consists of at least a fold of the water impermeable material, which fold encloses no part of the inner pouch, thereby permitting perforation of the outer envelope in the area of the bottom fold. Alternatively, the bottom fold can have incorporated therein a string or string members suitable for tearing the pouch open at the bottom end. Likewise, the bottom end can be provided with a tab which permits tearing it open to permit the aqueous infusion to escape from the container itself.

Reference now to the drawings will illustrate the mechanics of the construction and the use thereof.

FIGURE 1 represents an exploded perspective view showing the pouch, and support members in appropriate relationship.

FIGURE 2 illustrates the use of the device when it is in place on a cup to receive the aqueous infusion.

FIGURE 3 is a cross-section thru the pouch shown in FIGURE 1 to show the relationship of the folds in the bottom and the structure itself to the infusion and FIGURES 4 and 5 show the alternative methods of providing a perforation in the pouch for permitting the infusion to escape, FIGURE 4 showing the use of a string and FIGURE 5 showing the use of a tab.

For the better understanding of the nature of the invention one of the physical embodiments is hereinafter described in reference to FIGURE 1.

An outer aluminum container is formed by holding by the middle a rectangular aluminum foil sheet 1. This fold may be considered as the original bottom of the pouch 2. A thin (1 mm. thick) wood plate 3 about 5 cm. long and 1 cm. wide is inserted in such a way that it lies edgewise along the original bottom 2. Said wood piece is provided with a hole 4, preferably in the center. The bottom part of the foil sheet is folded once over the wood piece insert, in such a way as to surround it firmly. This second fold 5 defines the final bottom of the pouch. The two side edges of the folded sheet are now sealed 6. The hole in the wood part can be identified by means of a depression 7 in the foil, or by any other convenient mark. A second bag, this time made out of filter paper 8, is formed to fit snugly inside the modified foil pouch and the bag may then be filled with the appropriate grind of coffee 9. The aluminum foil bag is sealed along its upper edge 10 after filling it. The supporting members of the device are made by cutting two triangular cardboard pieces 11 and folding them at the middle, in such a way that two identical triangular sections 12 are defined for each original triangular blank. One slot 13 is cut on each triangular section that will eventually take the rim of the cup. These two holding members are then fastened to the lower part of the sides of the coffee pouch, taking care that the upper cut of the slot coincides with the bottom edge of the pouch 5. The four triangular support legs so defined are, then, folded in such a way that the whole device remains substantially flat. A toothpick or other similar rigid part with a sharp point is attached to the pouch.

The way in which the device is used to make the brew can be better understood in connection with FIGURE 2.

The top of the device 1 is torn off defining a mouth 2 that is spread open by hand. The four triangular legs 3 are folded out and the slots 4 are adapted to the rim of the cup 5 that will be used to receive the brew. Hot water is poured through the mouth 2 into the coffee grounds 6 and is allowed to stay in contact with the grounds for the desired period of time (1–3 min.). When the brew is ready, the toothpick 7 is used to puncture the outer foil layer carefully but firmly in the lower part of the pouch at the point where it is indicated 8 and which coincides with the already mentioned hole in the piece at the bottom of the pouch. The brew will flow through the puncture 9 made into the cup 5; more hot water may then be added through the mouth of the self supporting pouch until the cup is full. The whole assembly may then be discarded and a good cup of coffee of the desired strength will have been obtained.

Although a particular mechanical device has been selected to illustrate the novel residence time feature of this invention, other mechanical solutions will be apparent to anybody familiar with the idea. For instance, a long rigid wire or flat stick can be introduced from above in the space between the filter paper lining and the aluminum foil pouch to pierce only the bottom of the foil, in which case, the wood insert mentioned is not necessary. Other possibility is the use of one or more tear strips or strings that by appropriate manipulation will cause the aluminum foil envelope to tear at the bottom, allowing the hot infusion to flow into the receiving cup.

Referring to FIGURE 4, it will be seen that the string 15 can be merely laid in the bottom of the fold and be allowed to protrude from either or both ends of the sealed packet as shown in the figure. In use, it is necessary merely carefully to grasp the string at one end or the other and tear it by pulling against the fold in which it lies. This quickly opens a corner of the pouch and permits the material to drain therefrom.

In FIGURE 5, there is shown the modification including the tab for tearing the pouch open. The tab can be a separate piece like the string or it can be merely an extension of the pouch itself to give the user something to grasp and to tear past the sealed edge itself.

The system of controlling the extraction time at will, by means of the mechanical devices described, or any other similar ones, may be applied to most of the individual extractors which have heretofore been designed.

What is claimed is:

1. A device for the extraction of soluble portions of vegetable matter suitable for the making of aqueous infusions thereof, comprising an outer impermeable container formed of juxtaposed sheets having edges thereof sealed together to define a bottom end, two upwardly extending walls and a top, said bottom end of the outer impermeable container being fitted with a supporting means with means to facilitate the piercing of the container, said outer impermeable container enclosing an inner water permeable bag, generally conforming to the shape of said outer container, said outer container having attached supporting flap members, provided with means to accommodate the rim of a receiving vessel, whereupon the device can be placed, while making a hot infusion of the vegetable matter therein.

2. A device for the extraction of soluble portions of vegetable matter suitable for the making of aqueous infusions thereof comprising: an outer impermeable envelope having the edges of sheets sealed together to define a bottom edge, two upwardly projecting walls and a top edge, said bottom edge of the outer impermeable envelope being fitted with a supporting member in the form of a thin, rectangular rigid means of such length that it can be positioned edgewise along the bottom edge of said outer impermeable envelope, said supporting member being kept in position by folding of said outer envelope bottom edge over and around said supporting member, said supporting member being provided with a plurality of holes to define areas for piercing the bottom of said outer envelope, said outer impermeable envelope enclosing an inner water permeable bag generally conforming to the shape of said outer envelope, said inner water permeable bag being open along its upper edge to admit water for the infusion of the vegetable matter therein, said outer envelope having supporting flap members attached to the side edges of the outer envelope, said members being provided with means to accommodate the rim of the vessel whereupon the device can be affixed while making a hot infusion of the vegetable matter therein.

3. A device in accordance with claim 1, wherein said means for rupturing the bottom of said outer container consists of anchored string to tear the bottom of said outer container by appropriate manipulation of said strings therefor.

4. A device in accordance with claim 1, wherein said means for rupturing the bottom of said outer container consists in suitable scoring in the outer container to facilitate the tearing along said scoring.

References Cited

UNITED STATES PATENTS

| | | | |
|---|---|---|---|
| 2,289,747 | 11/1945 | Stone et al. | |
| 2,728,671 | 12/1955 | Young et al. | 99—77.1 |
| 2,779,462 | 1/1957 | Hoag. | |
| 2,835,191 | 5/1958 | Clurman | 99—304 |
| 2,880,534 | 4/1959 | Lund | 40—124.1 |
| 3,159,096 | 12/1964 | Tocker | 99—77.1 |
| 3,199,437 | 8/1965 | Nelsen | 99—295 |

FOREIGN PATENTS

| | | |
|---|---|---|
| 988,754 | 5/1951 | France. |
| 528,819 | 6/1955 | Italy. |

WALTER A. SCHEEL, *Primary Examiner.*

R. W. JENKINS, S. P. FISHER, *Assistant Examiners.*